US007856390B2

(12) United States Patent  
Schiller (10) Patent No.: US 7,856,390 B2  
(45) Date of Patent: Dec. 21, 2010

(54) SYSTEM, REPORT, AND METHOD FOR GENERATING NATURAL LANGUAGE NEWS-BASED STORIES

(75) Inventor: Victor Hugo Schiller, Charlottesville, VA (US)

(73) Assignee: VHS, LLC, Charlottesville, VA (US)

( * ) Notice: Subject to any disclaimer, the term of this patent is extended or adjusted under 35 U.S.C. 154(b) by 0 days.

(21) Appl. No.: 12/134,007

(22) Filed: Jun. 5, 2008

(65) Prior Publication Data

US 2008/0306882 A1    Dec. 11, 2008

Related U.S. Application Data

(60) Provisional application No. 60/942,356, filed on Jun. 6, 2007.

(51) Int. Cl.  
*G06Q 40/00* (2006.01)

(52) U.S. Cl. .................................................. 705/36 R

(58) Field of Classification Search ................. 235/375; 340/506; 356/39; 434/322; 700/99; 703/27; 705/4, 30–45; 709/201; 715/205  
See application file for complete search history.

(56) References Cited

U.S. PATENT DOCUMENTS

| | | | | |
|---|---|---|---|---|
| 6,408,282 | B1 * | 6/2002 | Buist ......................... | 705/36 R |
| 6,583,794 | B1 * | 6/2003 | Wattenberg .................. | 715/708 |
| 7,430,532 | B2 * | 9/2008 | Wizon et al. ............... | 705/36 R |
| 7,475,032 | B1 * | 1/2009 | Patnode et al. ............ | 705/36 R |
| 2001/0051904 | A1 * | 12/2001 | Nishimura .................... | 705/27 |
| 2001/0051907 | A1 * | 12/2001 | Kumar et al. ................. | 705/36 |
| 2002/0133447 | A1 * | 9/2002 | Mastman ...................... | 705/36 |
| 2002/0174056 | A1 * | 11/2002 | Sefein et al. .................. | 705/37 |
| 2002/0184237 | A1 * | 12/2002 | McFeely .................. | 707/104.1 |
| 2002/0188543 | A1 * | 12/2002 | Wizon et al. ................... | 705/36 |
| 2003/0110106 | A1 * | 6/2003 | Deshpande et al. ........... | 705/35 |
| 2003/0135445 | A1 * | 7/2003 | Herz et al. ..................... | 705/37 |
| 2003/0187772 | A1 * | 10/2003 | Papka .......................... | 705/36 |
| 2003/0233309 | A1 * | 12/2003 | Matus et al. ................... | 705/37 |
| 2004/0153333 | A1 * | 8/2004 | Oshima et al. ................. | 705/1 |
| 2005/0144109 | A1 * | 6/2005 | Boni et al. ..................... | 705/36 |
| 2006/0020538 | A1 * | 1/2006 | Ram et al. ..................... | 705/37 |
| 2006/0026088 | A1 * | 2/2006 | Grossman et al. ............. | 705/37 |
| 2006/0235786 | A1 * | 10/2006 | DiSalvo ........................ | 705/37 |
| 2007/0005481 | A1 * | 1/2007 | Kedia et al. ................... | 705/37 |
| 2007/0203816 | A1 * | 8/2007 | Costache et al. .............. | 705/35 |

OTHER PUBLICATIONS

Dynamic Flow-Through Context Switching of Investment Data Into Multiple Investment Tools, Harvest Technology Inc, Aug. 3, 1998.*

* cited by examiner

*Primary Examiner*—Mary Cheung  
*Assistant Examiner*—Tien C Nguyen  
(74) *Attorney, Agent, or Firm*—Vedder Price P.C.

(57) ABSTRACT

The present invention generally relates to a system, report, and method for automatically generating a series of natural language news-based stories to be presented via a digital interface or printed publication to a portfolio user. The disclosure relates to a filter for selection of a handful of relevant and desired financial instruments for a specific use. These financial instruments, based on different selections from a portfolio manager via a management tool, are then used to either produce either a strategies page where a list of useful covered call trades and hedged trades are displayed in the form of a table or natural language news-based stories relating to a selected list of financial instruments found in a portfolio.

20 Claims, 7 Drawing Sheets

FRESH Financial
BREWED News
MEDIA Service — 120

Actionable financial news when you need it most

Symbol: [___________] — 121   From Date 6/5/2007 — 122   To Date 6/5/2007 — 122   Submit | Today — 123

Keyword: [___________] — 124   ☐ Market Brief  ☐ SPHSA  ☐ 10HPWA  ☐ IB  ☐ SP  ☐ Premium Content  ☑ All — 131
                                125            126       127          128    129    130                117

(Enter a stock symbol, or leave blank for all, the from date and to date (in format 01/01/2007), and or keyword, then click. [Submit]Button)

$ Of Records:  550
Record: 1
Stock Symbol:  CMI
Headline:  Cummins NewsBite
Alt-Headline:  CMI Jumping On Positive Economic Outlook
Story:  Cummins Inc. (CMI) opened at 94.85.  So far the stock has hit a low of 94.52 and a high of 100.37.  CMI is now trading at 99.12, up 4.51 (4.77%). After hitting a one year high of 107.23 in April, the stock has backed off slightly, but bounced off the 86 mark and has recently established support around 913  While many stocks are taking a hit after Bernanke's comments, suggesting the economy will rebound and therefore making a rate cut sound unlikely, industrial goods manufacturer CMI could be benefiting from the idea of continuing economic progress, which could mean good things for the company.  Recent technical indicators for the company have been bullish and deteriorating slightly, while S&P gives the stock a neutral 3 STARS (out of 5) hold rating.  If you're looking for a hedged play on this stock, consider a July bull-put credit spread below the $85 range.  CMI hasn't been below 85 since April and has shown support above 90 recently.  [LHF - Seven Summits Strategic Investments NewsBite}
Source:  Market Brief Copyright ©1962-2007 Fresh Brewed Media   Use of This Content Without Written Authorization is a Violation of this Copyright.

FIG. 4

Investors Observer Automatic Portfolios Management Tools

Select Option Strategies Page

[Analysts Favorites ▼] [View Page]  — 101

Dropdown options:
- Analysts Favorites
- Momentum Plays
- Hedged Dividend Income
- Stocks In The News bols for this strategy.
to enter anything here if you want to follow S&P's outlook for the stock. But if you want the trades stock enter a "+", "++", "+++", or "++++" here if you are bullish and want out-of-money trade ideas for these stocks. More "+" signs mean more bullish and the sold options will be farther out of the money. If you are bearish on a stock you can enter "-", "--", "---", or "----".
Sold Call Option Symbol - If you want a specific sold call option symbol used.
Exclude From List - Place a check mark in this column for stocks you do not want to use for the strategies.

| Stock Symbol 104 | Push Factor (+, ++, +++, ++++, +++++ or -, --, ---, ----, -----) | Sold Call Option Symbol | Exclude From List | News Line | Delete Stock From List |
|---|---|---|---|---|---|
| AAPL | ++ | | ☐ 102 | | Delete AAPL 102 |

106, 107, 108, 109

70 Total Stocks In List.

Add stocks to the list [________103________] [Add Stocks]
(Enter stocks with a comma after each then click [Add Stocks])

[Submit Change] 113    [Recover Default Values For Today] 114 (use this button to reset the table above)

[Click Here To Preview Strategies Page] 111
(Note: After you click the button it could take several minutes to generate the trades)

Note: Strategies based on these stocks will not be displayed on the live web page until after 8PM Eastern Time. If you would like the live web page updated now use the button below.

[Click Here To Update Live Web Page Now] 112

[Click Here To Generate News Stories Now] 115

FIG. 5

Home I Login I About Us I First Month for $1 I Free InvestorPerks Signup I Special Reports I Help I Contact Us Investors Observer Automatic Portfolios Management Tools Select Option Strategies Page

[Stocks In The News ▼] [View Page]

Stock Symbol - The stock symbols for this strategy.
Push factor - You do not need to enter anything here if you want to follow S&P's outlook for the stock. But if you want the trades to reflect your outlook for the stock enter a "+", "++", "+++", or "++++" here if you are bullish and want out-of-money trade ideas for these stocks. More "+" signs mean more bullish and the sold options will be farther out of the money. If you are bearish on a stock you can enter "-", "--", "---", or "----".
Sold Call Option Symbol - If you want a specific sold call option symbol used.
Exclude From List - Place a check mark in this column for stocks you do not want to use for the strategies.

| Stock Symbol | Push Factor (+, ++, +++, ++++, +++++ or -, --, ---, ----, -----) | Sold Call Option Symbol | Exclude From List | News Line | Delete Stock From List |
|---|---|---|---|---|---|
| AMLN | - | | ☐ | The stock dropped 6.72% in trading yesterday as | Delete AMLN |
| AMR | - | | ☐ | The stock fell 4.85% yesterday in a sinking | Delete AMR |

InvestorsObserver.com
Better Strategies For Making Money
For Investors with a Sense of Humor Home | Login | About Us | First Month for $1 | Free InvestorPerks Signup | Special Reports | Help | Contact Us

Stocks In The News

Covered Call Trade Summary Table:

| Trade Date | Stock Symbol | Sell Option | Sell $ | Net Debit (Break Even) | %Downside Protection | Assigned Return Rate | % In The Money | Expiration Date |
|---|---|---|---|---|---|---|---|---|
| 6/6/2007 | AMLN 3 STAR (43.52) 43.00 | CALL AQM AH Jan '08 | 8.50 | 35.12 | 19.49% | 13.9% 22.34%* Annualized +0% An Div Rate | 6.3% | 1/19/2008 227 Days o-o-o-, Moderate Relative Risk |
| CRAY - No Trade Available For Stock Symbol ||||||||||
| 6/6/2007 | D 4 STAR (87.87) 87.08 | CALL D JR Oct '07 90.00 | 3.10 | 84.77 | 3.53% | 6.17% 16.56%* Annualized -3.2% An Div Rate | -2.42% | 10/20/2007 136 Days o-o-o-o-, Low Relative Risk |

Hedged Trade Summary Table:

| Trade Date | Stock Symbol | Buy Option | Sell Option | Net Debit | Break Even | % In The Money | # of Cont. | Total Debit | Target Return | Return Rate | Near Term Expiration Date |
|---|---|---|---|---|---|---|---|---|---|---|---|
| 6/6/2007 | AMLN 3 STAR (43.62) 43.00 | CALL AQM AF Jan '08 30.00 15.80 | CALL AQM AH Jan '08 40.00 8.50 | 7.30 | 37.30 14.49% DnSd Prot | 0.3% | 10 | 7,300 | 2,700 | 36.99% 59.47%* Annualized | 1/19/2008 227 Days o-o-, Considerable Relative Risk |
| CRAY - No Reasonable Trade Available For Stock Symbol ||||||||||||

NOTE:
If an "*" is shown for the S&P STAR Rating then the stock is not covered by S&P
* Annualized Returns for Comparison Purposes only
** Stock price at expiration of sold option or at time of closing trade Analysts comments and news on these stocks...

AMLN...The stock dropped 6.72% in trading yesterday as the company announced it intends to sell $400 million of convertible senior notes, expected to be due in 2014.
CRAY...The stock dropped 9.43% yesterday as Thomas Weisel Partners Is lowered its estimate for the company to 0.38 from 0.41.
D...The stock was up 0.26% yesterday as the company revealed that it agreed to divest most of its exploration and production businesses for about $6.5 billion in two separate transactions before the end of August.

FIG. 8

SYSTEM, REPORT, AND METHOD FOR GENERATING NATURAL LANGUAGE NEWS-BASED STORIES

CROSS-REFERENCE TO RELATED APPLICATION

This application claims the benefit of and priority from U.S. Provisional Patent Application No. 60/942,356, filed on Jun. 6, 2007, entitled SYSTEM, REPORT, AND METHOD FOR GENERATING NATURAL LANGUAGE NEWS-BASED STORIES, which application is expressly incorporated herein by reference.

FIELD OF THE INVENTION

The present disclosure generally relates to a system, report, and method for automatically generating a series of natural language news-based stories by a portfolio manager for financial instruments using a news brief entered by the portfolio manager, and more precisely, to the automatic creation of natural language news-based stories relating to a selected list of financial instruments found in a portfolio.

BACKGROUND

With the arrival of online electronic communication, the floodgates to all manner of content have opened. This content rapidly becomes overwhelming if unmanaged. Users and information service providers must learn to distinguish between useful information and useless information in this digital sea of information. This problem is compounded when little or no reaction time is available to distinguish between useful and useless information. For example, the trade of financial instruments, such as stocks, bonds, and option contracts, requires constant updates of the positions of each financial instrument in the marketplace.

The value of these financial instruments, generally grouped into sectors, categories, or portfolios when associated with a private or corporate entity, evolves constantly. With globalization and international relationships between corporations, a hurricane occurring overnight in the Philippines can impact stock values of a corporation engaged in, for example, the sale of camping equipment.

For this reason, portfolio managers and owners of financial instruments generally must be on the lookout for information relevant to their holdings, be it likely to have a positive, neutral, or negative impact the values of their instruments. One method of meeting this need is to employ the services of brokerage firms or brokers specialized in financial instruments. Because of the large diversity of instruments on the market, brokers often serve as intermediaries to in-house experts in a specific field. As a result, if a portfolio owner owns one utility stock, a covered call stock of a mining stock, and an international stock, the broker serves as the go between and compiles the needed information for the client. The time needed for active brokers to provide important information to clients is often too great to allow for the information to maintain its usefulness.

Another method involves the ongoing review of news briefs and reading specialized online or paper-based publications in search of relevant information. This method rapidly turns into a fishing expedition when relevant data must be extracted from a wide variety of news sources. Once again, the time associated with the collection, compilation, and review of available data to distil the relevant information renders this method quite unsatisfactory.

Finally, a recent method corresponds to the online creation by portfolio users of a list of financial instruments at a website where a large database of information can be accessed. Each stock is given a hyperlink that can be clicked when information on the stock is desired. This method requires users to be constantly on the lookout for new information and is time consuming. What is needed is an automated method available for portfolio managers and experts for providing portfolio users and owners easy-to-understand news briefs relevant to their financial instruments in an expedited and efficient way.

BRIEF DESCRIPTION OF THE DRAWINGS

The features of the present disclosure are believed to be novel and are set forth with particularity in the appended claims. The disclosure may be best understood with reference to the following description taken in conjunction with the accompanying drawings. Figures that employ like reference numerals identify like elements.

FIG. 4 is a financial news service printout from an online system for automatically generating natural language news-based stories relating to financial instruments held in a portfolio are produced including a header according to an embodiment of the present disclosure.

SUMMARY

The present invention generally relates to a system, report, and method for automatically generating a series of natural language news-based stories to be presented via a digital interface or printed publication to a portfolio user. The disclosure relates to a filter or selection of a handful of relevant and desired financial instruments for a specific use. These financial instruments, based on different selections from a portfolio manager via a management tool, are then used to either produce a strategies page where a list of useful covered call trade and hedged trade are displayed in the form of a table, or natural language news-based stories relating to a selected list of financial instruments found in a portfolio.

DETAILED DESCRIPTION

The present invention is not limited to the particular details of the system, report, or method depicted, and other modifications and applications may be contemplated. Further changes may be made in the above-described system, report, and method without departing from the true spirit of the scope of the invention herein involved. It is intended, therefore, that the subject matter in the above depiction should be interpreted as illustrative, not in a limiting sense.

Within the scope of this disclosure, the term "financial instrument" in the broad sense represents all and every traded instrument and includes, for example, cash, stocks, bonds, treasury bonds, options contracts, loans, bond futures, interest rate swaps, interest rate options, bills, commercial paper, deposits, certificates of deposits, short-term interest rate futures, forward rate agreements, exotic instruments, equity futures, spot foreign exchange, currency futures, foreign exchange options, ownership interest, or any and all other instruments that can be traded.

The present invention generally relates to a system 100, report, and method for automatically generating 8 a series of natural language news stories 10 directed to financial instruments named and found in a portfolio and managed by a stock portfolio manager 1. The stock portfolio manager engages in the selection of stocks 3 using a management tool 4 to modify the portfolio of financial instruments 5 at an option strategies page 6 or directly enters information at the option strategies page 6.

Figure 1:
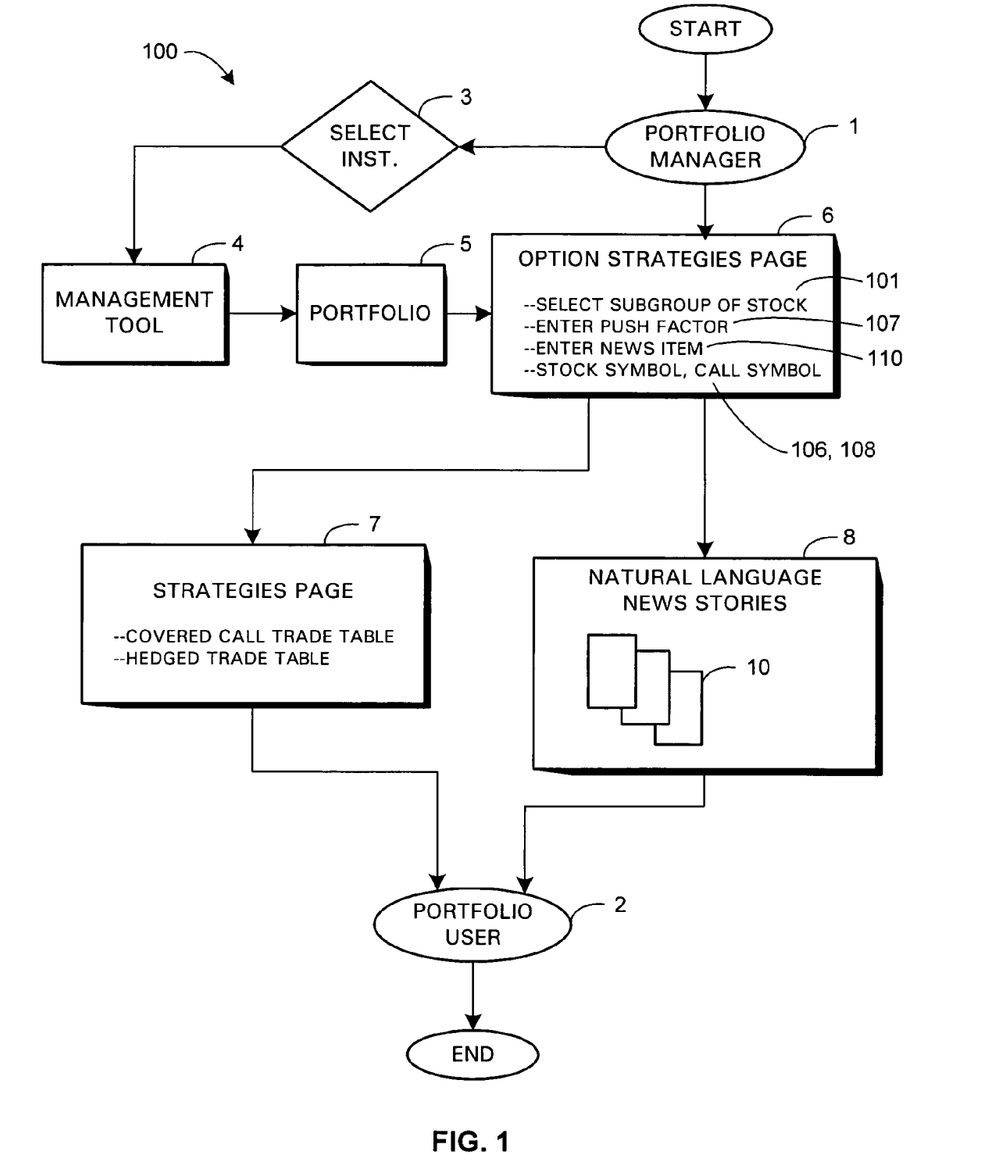
FIG. 1 is a schematic diagram of the method for generating natural language news-based stories relating to financial instruments held in a portfolio according to a first embodiment of the present disclosure.

FIG. 1 is a schematic diagram of the method 100 for generating natural language news-based stories 8 relating to financial instruments held in a portfolio 5 according to a first embodiment of the present disclosure. The schematic diagram is provided for convenience and comprehension purposes with start and end buttons placed respectively at the top and the bottom the diagram. Single-direction arrows are also shown to further improve comprehension. While a series of steps is shown in a specific order with associated arrows indicating a specific arrangement, what is in fact contemplated and disclosed is the use of the steps shown, arranged in a plurality of different configurations, with arrows oriented accordingly in order to allow a portfolio manager 1, such as a writer, a technical writer, or other author, to provide the information to the portfolio user 2, including a series of natural language news stories 10 created from data assembled from other sources.

Figure 5:
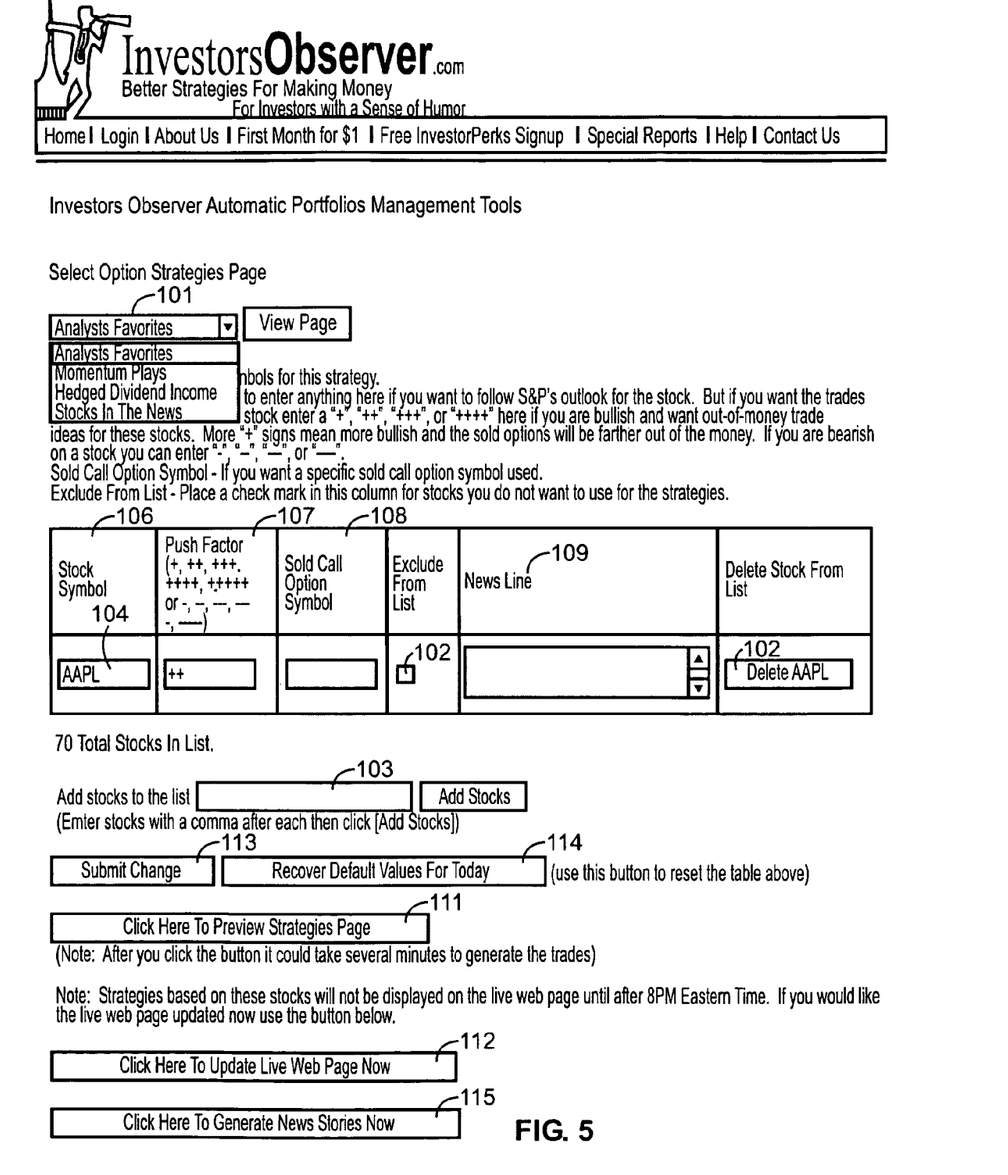
FIG. 5 is an option strategies page from an online system for automatically generating natural language news-based stories relating to financial instruments held in a portfolio are produced including a header according to an embodiment of the present disclosure.

FIG. 1 shows how a portfolio manager 1 can select financial instruments 3 in order to manage 4 a portfolio 5. Some management tools are shown in the options strategies page 6 shown in FIG. 5, where a drop-down menu 101 allows a portfolio manager 1 to select groups or subgroups of financial instruments associated with predefined criteria. In another embodiment, portfolio managers 1 can use boxes or buttons 102 to delete or exclude from the list certain stocks. FIG. 5 shows how another contemplated management tool 4, such as an add stock box 103, can be used to add specific stocks or financial instruments to the list. One of ordinary skill in the art recognizes that while one possible embodiment of portfolio 5 management 4 is shown, what is known and contemplated is the use of any software interface where stocks can be managed in a portfolio 5, including but not limited to drag-and-drop interfaces, icon-based systems, and even elements equipped with artificial intelligence algorithms.

Figure 6:
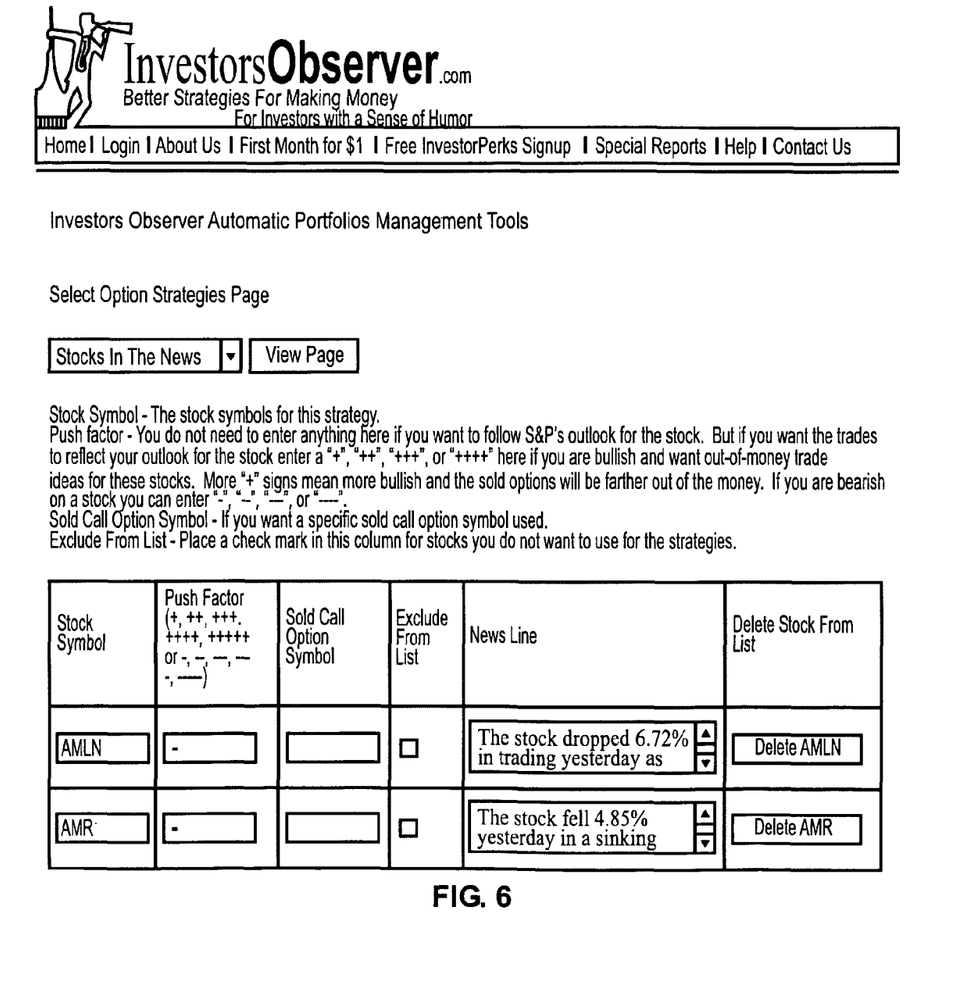
FIG. 6 is the option strategies page of FIG. 5 where a news brief is inserted in the news line item according to another embodiment of the present disclosure.

Once the portfolio manager 1 has selected or changed a specific portfolio 5 using the management tool 4, the group of financial instruments and associated information is presented. FIG. 5 shows one such interface where the portfolio manager 1 is presented the information in the form of a table with each stock shown on a different row 104 of the table. On each row 104, the financial instrument include columns such as a symbol 106, a push factor associated with the stock 107, a sold call option symbol 108, a news window 109, and a delete stock from list button 102. FIG. 6 is an example of certain stocks (AMLN, AMR) where the news window 109 is filled with a news item 110.

In one embodiment shown in FIGS. 5 and 6, the user has the default option of using as a push factor 107 the S&P outlook of the financial instrument. One of ordinary skill in the art recognizes that while one leading stock outlook indicator is given as the default option, any indicator can be used and is contemplated. What is also contemplated is the use of an indicator made of a series of plusses "+" or minuses "−" used as "++++" for the most favorable outlook possible and "−−−−" as the least favorable outlook possible on the stock. This outlook is then incorporated as information relevant to the stock and associated with the production of the natural language news stories 10 at a later step of the above described system, report, and method. What is shown and described is only one possible embodiment where an option strategies page 6 with subgroups of stocks, push factors, news items, and stock symbols/call symbols are shown.

Figure 8:
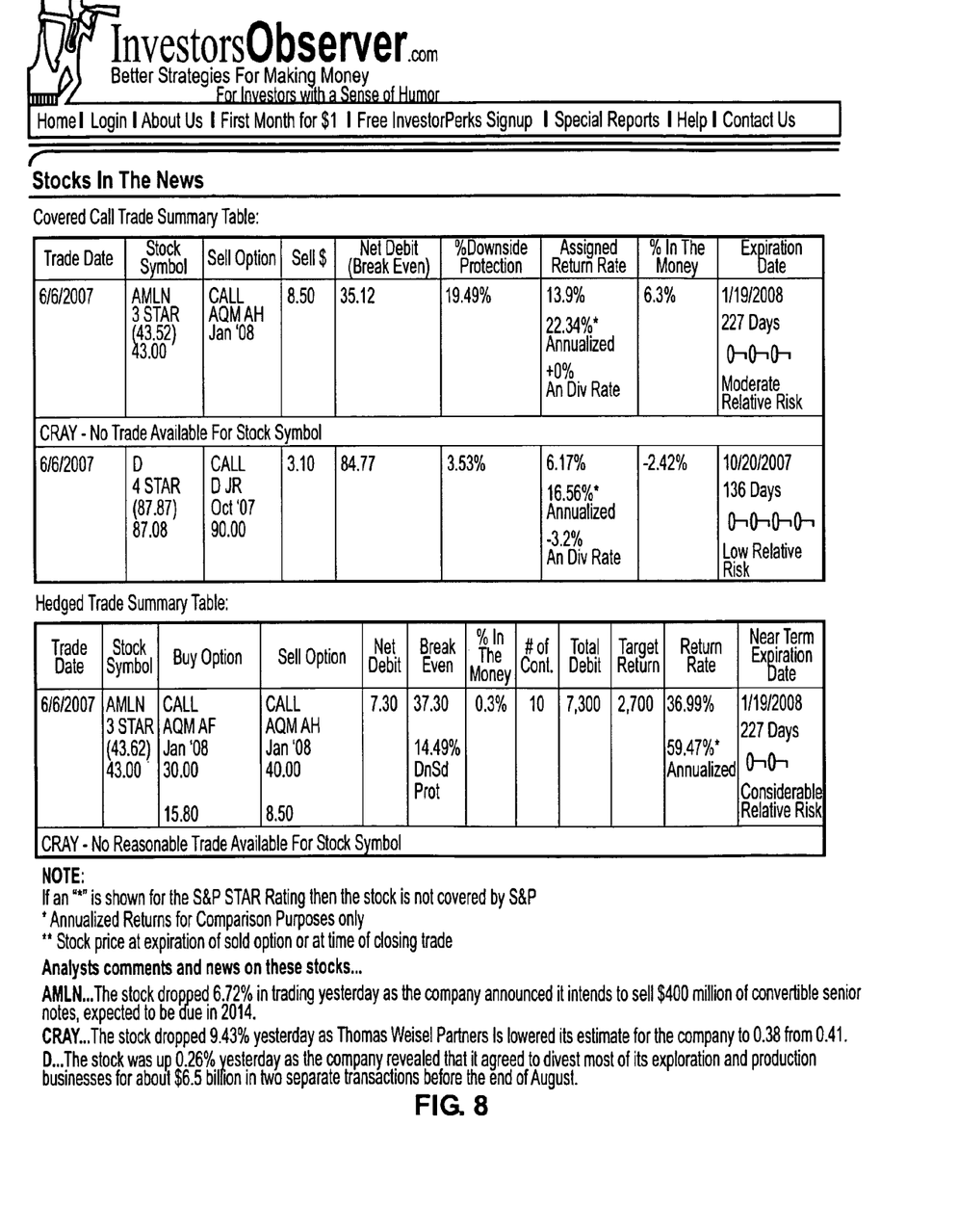
FIG. 8 is an Internet display of the strategies page produced by the system shown in FIG. 3 according to another embodiment of the present disclosure.

In a subsequent step, either a strategies page 7 is created or a natural language news stories 8 is created for a portfolio user 2. The creation of the strategies page 7 made of a covered call trade table and a hedged trade table as shown in FIG. 8 is fully described in the U.S. patent application Ser. No. 11/556,031 filed on Nov. 2, 2006, entitled SYSTEM, REPORT, AND COMPUTER-READABLE MEDIUM FOR ANALYZING A STOCK PORTFOLIO, which application is hereby fully incorporated herein. FIG. 5 also shows other tools, such as a preview button 111 to produce the strategies page 7 shown in FIG. 8 based on the portfolio 5 selected by the portfolio manager 1 in the option strategies page 6. FIG. 5 also shows a function where the strategies page 7 can be displayed on a webpage. The system shown in FIG. 5 comprises a first button 112 to update the generated live webpage, a second button 113 to submit the changes, a third button 114 to reset default values of the page once it has been changed using the second button 113, and finally, a fourth button 115 to generate a series 8 of natural language news stories 10. A sample printout of the series 8 of natural language news stories is shown in FIG. 4.

FIG. 4 is a single website generated on the Internet and shows a sample header 116 and search tool 117 for news stories 10 placed directly above the news stories window 118. The header shown in FIG. 4 includes a trademark 119, a slogan 120, and a search tool 117. The search tool 117 in the contemplated embodiment can index the different news stories 10 by symbol 121, by date issued 122, on a daily basis 123, with user-selected keywords 124, or with other specific keywords such as market brief 125, SPHSA 126, IOHPWA 127, IP 128, SP 129, premium content 130, or the selection of all news stories 131. One of ordinary skill in the art recognizes that while a handful of search tools are provided to a portfolio user 2, any combination or variation of search tools is contemplated.

Figure 2:
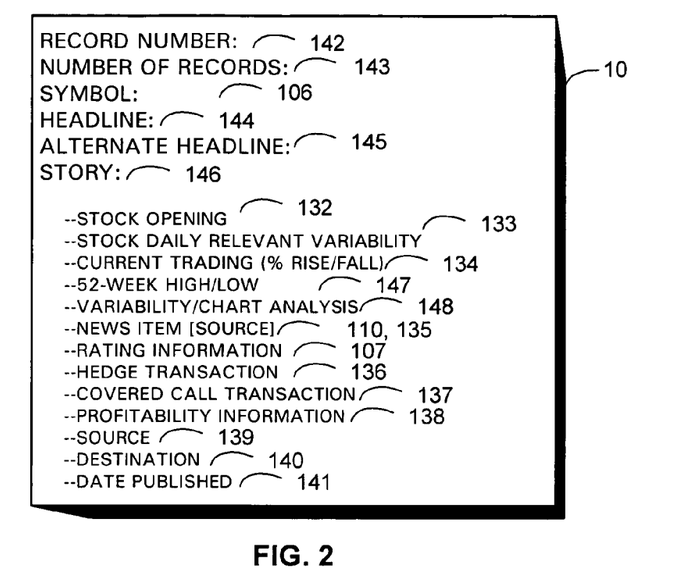
FIG. 2 is a schematic diagram of the an automatically generated natural language news-based story as shown in FIG. 1.
Figure 7:
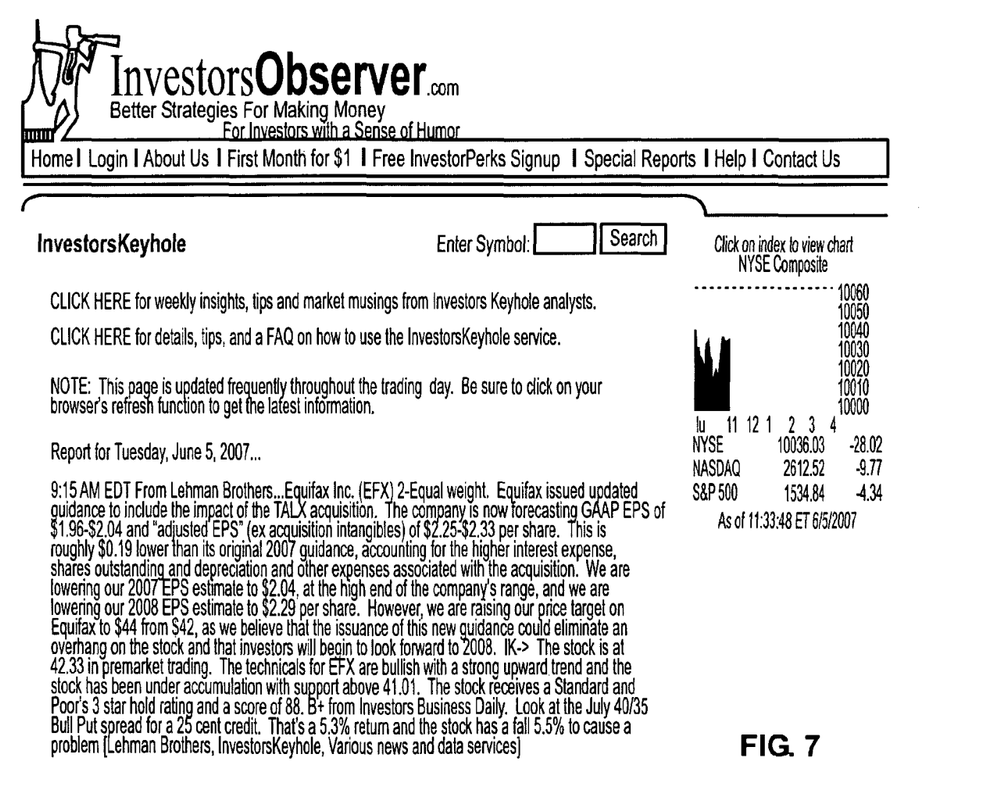
FIG. 7 is a webpage illustration of portions of the news report produced by the system shown in FIG. 3 according to another embodiment of the present disclosure.

FIG. 2 illustrates one natural language news story 10 generated from a specific stock from the option strategies page 6. In the natural language programming tool, what is contemplated is the use of information, such as stock opening data 132, daily stock relevance variability 133, current trading or variations in percentages 134, a 52-week high and low for the stock 147, a variability chart analysis 148, a news item along with the source 135, rating information 107, an optimal hedge transaction 136, a covered call transaction 137, profitability information 138, a source 139, a destination 140, a date published 141, and a header including an individual record number 142, a total number of records 143, the stock symbol 106, a headline 144, an alternate stock headline 145, and a story header 146. This news stories 10 format is illustrated in FIG. 4. FIG. 7 illustrates another possible embodiment of the present display of news stories having another format where the date published is used as a principal indexing tool.

In the field of stock analysis, individual stock news stories are created rapidly and may be classified by financial instruments of interest, field of interest, or other parameter. A first analysis might focus on all stocks in the mining industry while another stock analysis might focus on news relating to all stocks starting with a specific letter of the alphabet. When a new news item 110 is released, such as, for example, relevant tax issues, corporate governance, change in geopolitical situation, etc., the stocks capacity to be influenced by this news must be noted. A service associates the news item 110 with different corporations relevant to the news item 110. An author then reviews the stock position and manually associates the current stock information to the news item 110. For example, if the French government enacts a law against the music player iPod, holders of the stock MAC must be notified. Before this disclosure, an in-house analyst would collect the MAC stock-related position, conduct costly and time-consuming research, and associate them to the news item 110, the 52-week high, the 52-week low, and other relevant issue. Because this service is sold to clients, the creation of a uniform, boilerplate, computer-generated story is impractical and has reduced readability. What is contemplated is the use of a news-generating algorithm with sentence and paragraph reconstruction to simulate natural language. In one contemplated embodiment, syntax and grammar rules are devised to emulate man-made text. In another contemplated embodiment, keywords are merged into a bank of predefined and variable sentences and paragraph templates to simulate man-made text. By way of example, as shown in FIG. 4, the information of a 52-week high of $107.24 in April 2007, a 52-week low of $86 in May 2007, and a chart analysis of a technical support at $90 would be given as something like the following: 52-Week High: $107.24-Apr. 27, 2007; 52-Week Low: $86.65-May 2, 2007; Technical Support: $90.34. This dry construction is of limited utility in the form of a news item.

The use of basic grammar and paragraph construction methods provides the same information to customers in the form of basic sentences such as the following: The 52-week high was $107.24 reached on Apr. 27, 2007; the 52-week low of $86.65 was reached on May 2, 2007; and technical support of $90.34 is noted. Either a human author or computer software is capable of merging this information, removing irrelevant data, conforming dates for convenience and consistency, such as creating a series of boilerplate sentences to be repeated in a round-robin method, to produce the following sentence: "After hitting a one-year high of $107.23 in April, the stock has backed off slightly, but bounced off the 86 mark and has recently established support around 90." The commercial advantages of this last version are very important in an field where information synthesis is as important as information disclosure. For example, a calculated support is approximate and based on linear extrapolation methods. A support value of 90 is sufficient for a stock that moves between $86 to $107 but would be insufficient for a stock that moves between $89.75 and $91.00.

Figure 3:
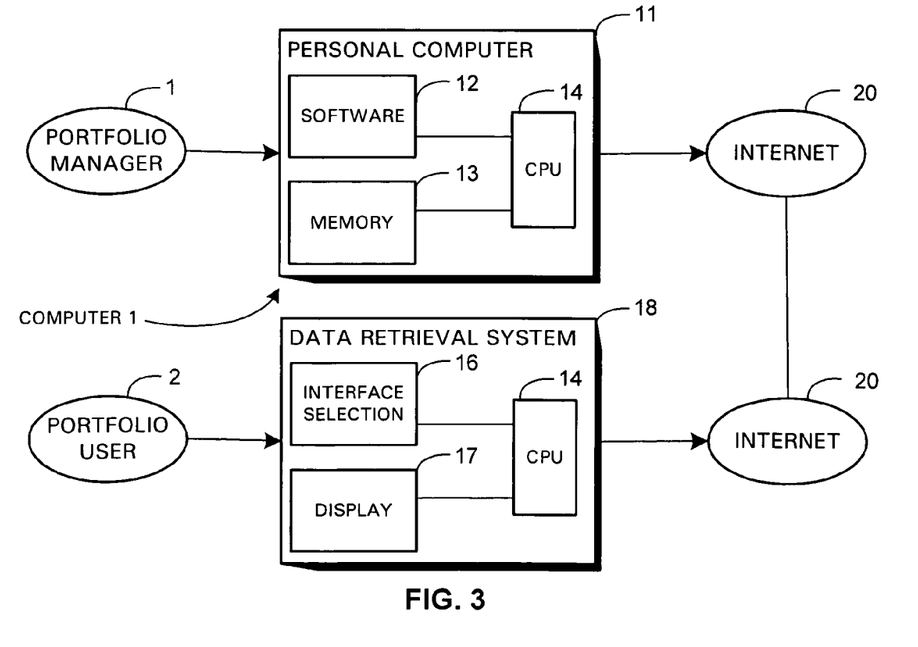
FIG. 3 is an overview of the system for generating natural language news-based stories relating to financial instruments held in a portfolio according to another embodiment of the present disclosure.

This disclosure contemplates all known methods of implementing on a central processor unit 14 as shown in FIG. 3 using software 12 having a method of creating natural language from text that may not be in, for example, full and complete sentences. What is also contemplated is the use of a large quantity of templates with input variables where a data field can be completed. In the above example, one possible template designed for a case where the one-year high is reached before the recent low with an intermediate support: "After hitting a one-year high of [52-week high] in [month and year], the stock has backed off [calculate variation adjective on parsed table] but bounced off the [52-week low] mark and has recently established support [$ value of support only if previous values more distant than $3, otherwise decimals]." In yet another embodiment, an additional parsing table is used to vary the terms within the sentence. By way of example, the term "slightly" could be used when the variation from the 52-week low is less than 3%, the term "mildly" could be used when the variation reaches 6%, and so on.

FIG. 3 shows a functional diagram of the automatic natural language news story generating system as physically embodied according to a first embodiment of the present disclosure. In one contemplated embodiment, the portfolio manager 1 uses a first personal computer 11 of any type or technology to conduct the above-defined operations and steps. The personal computer 11 is made of a central processing unit 14 functionally connected to software 12 designed to operate in tandem with the memory 13 in order to execute the software 12 in memory 13 and produce a tangible result. The personal computer 11 is connected to an Internet 20 known as an international network of a fixed protocol for data communication. A second data retrieval system 18, such as but not limited to another computer, a handheld device, a wireless telephone, or any other device where a central processing unit is connected functionally with an interface 16 and a display 17 is connected as shown on the Internet. The portfolio user 2 enters a command on the interface 16, which is then processed by the CPU 14 and sent via the Internet or other communication network to the personal computer where the information is collected and returned to the data retrieval system for display 17.

What is also contemplated is an automatic natural language news story generating system 100 from a stock portfolio including a personal computer 11 connected to an Internet 20 with a memory 13 and a central processing unit 14 in functional communication with the memory 13 and software 12 executed by the central processing unit 14. The software 12 executing an option strategies page 6 for entry by a portfolio manager 1 of a series of news items 110 associated to a series of selected financial instruments 3, and at least a related information for each of the selected financial instrument from the series of selected instruments in the portfolio 5. The system also includes a data retrieval system 18 connected to the Internet 20 in data connection with the computer 11, with a portfolio user interface 16, a central processing unit 14 connected to the user interface 16, and a display 17. The software 12 generates a natural language news story 10 based on the news item 110 and stock-related information for one of the series of selected stocks, wherein the data retrieval system 18 retrieves the natural language news story 10 from the personal computer 11 via the Internet 20 for display 17.

In a method for generating natural language news-based stories 10 directed to financial instruments named in a portfolio 5, the method includes the steps of selecting a portfolio of financial instruments 3 using a computer interface shown at FIG. 2 and offering a choice on the computer interface 12 between creating a strategies page 7 or a news stories page 8 produced from each of the financial instruments in the portfolio 5, wherein the news stories page 8 includes a plurality of natural language news stories 10, each including a date of publication 141, a story 146 rewritten in natural language using a template from a news brief 110, 135, and a source of origin 139 for the news brief.

In another embodiment, the first step of this method is preceded by the step of using a management tool 4 to define the portfolio 5. In another embodiment, the step of using the management tool 4 includes selection of financial instruments from a group of predefined choices 101 consisting of analyst favorites, momentum plays, hedged dividend income, stocks in the news, manual selection 103, related news line items 109, or stocks with a common push factor 107 as shown in FIG. 5.

FIG. 2 shows how the news brief (i.e., the story 146) is selected from a group consisting of a stock opening value 132, a daily variability of a financial instrument 133, a current trading expressed in percentage of rise or fall 134, a 52-week high value 147, a 52-week low value 147, a variability analysis data 148, a chart analysis data 148, a news item 110, 135, a rating 107, a hedge transaction 136, a covered call transaction 137, or profitability data 138. While a handful of possible news briefs 146 are shown, one of ordinary skill in the art recognizes that any newsworthy item associated with the trade and investment of financial instruments is contemplated.

In another embodiment, the step of using the management tool 4 includes the step of selecting from a group consisting of submitting changes to a defined portfolio table 113, recovering daily default values for the portfolio table 114, or updating live webpages 112 as shown in FIG. 5. FIG. 4 also shows a situation where each of the plurality of natural language news stories 10 include a header 116 or shown as a header on FIG. 2, selected from a group consisting of a record number 142, a number of records 143, a stock symbol 106, a headline 144, or an alternate headline 145.

In another embodiment a news report can be produced and comprises natural language news-based stories 10 relating to financial instruments 3 held in a portfolio 5. Each story 10 can includes a date of publication 141, a story 146 rewritten in natural language using a template (not shown but described) from a news brief, a source for the news item 139, and a header 116.

The news report can also be produced in the form of a webpage to be displayed on a computer screen or in the form of a computer file. This report can also be generated at the request of a portfolio user 2 based on the portfolio 5 as defined and updated using a management tool 4 by a portfolio manager 1. In another embodiment, the report is generated at the request of a portfolio manager 1 using a management tool 4 to select financial instruments 3 in the portfolio 5.

Finally, in yet another embodiment, the disclosure relates to a system 100 for generating natural language news-based stories 10 relating to financial instruments held in a portfolio 5. The system as best shown in overview in FIG. 3, where a computer 11 is connected to an Internet 20, the computer 11 comprising a memory 13 and a central processing unit 14 in functional communication shown by lines with the memory 13, and a software 12 executed by the central processing unit 14 in the memory 13. The software 12 selectively executes either a strategies page 6 or a news report 8 with a plurality of natural language news stories 10 for a plurality of financial instruments held in a portfolio 5.

The system 100 further includes a data retrieval system 18 connected to the Internet 20, the system 18 having a data connection with the computer 11. The data retrieval system 18 also includes a user interface 16, a central processing unit 14 connected to the user interface 16, and a display 17, wherein the software 12 located on the personal computer 11 generates the news report 10 based on a news brief for a plurality of financial instruments in the portfolio 5, and wherein the data retrieval system 18 retrieves either the strategies page 7 or the news report 10 from the personal computer 11 via the Internet 20 for display to the portfolio user 2. While FIG. 3 illustrates what can be seen as two different work stations located at two different locations with two different functions, what is contemplated is the use of one or more personal computers 11 along with any and all data retrieval system 18 to perform the described system.

It is understood that the preceding description is merely a detailed description of some examples and embodiments of the present invention and that numerous changes to the disclosed embodiments can be made in accordance with the disclosure herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A method for generating natural language news-based stories directed to financial instruments named in a portfolio, the method comprising the steps of:
   selecting a portfolio of financial instruments using a computer interface; and
   offering a choice on the computer interface between creating a strategies page or a news stories page produced from each of the financial instruments in the portfolio,
   wherein the news stories page comprises a plurality of natural language news stories, each including a date of publication, a story rewritten in natural language using a template from a news brief with a news-generating algorithm with sentence and paragraph reconstruction to simulate natural language selected from a plurality of templates each with input variables and at least a data field, and a source of origin for the news brief.

2. The method of claim 1, wherein the step of selecting the portfolio is preceded by the step of using a management tool to define the portfolio.

3. The method of claim 2, wherein the step of using the management tool includes a selection of financial instruments from a group of predefined choices consisting of analyst favorites, momentum plays, hedged dividend income, stocks in the news, manual selection, related news line items, or stocks with a common push factor.

4. The method of claim 1, wherein the news brief is selected from a group consisting of a stock opening value, a daily variability of a financial instrument, a current trading expressed in percentage of rise or fall, a 52-week high value, a 52-week low value, a variability analysis data, a chart analysis data, a news item, a rating, a hedge transaction, a covered call transaction, or profitability data.

5. The method of claim 3, wherein the step of using the management tool includes the step of selecting from a group consisting of submitting changes to a defined portfolio table, recovering daily default values for the portfolio table, or updating live webpages.

6. The method of claim 1, wherein each of the plurality of natural language news stories includes a header selected from a group consisting of an individual record number, a total number of records, a stock symbol, a headline, or an alternate headline.

7. The method of claim 3, wherein the push factor is an S&P outlook on the stock factor.

8. The method of claim 1, wherein a news report is generated by a system for generating the news-based stories with a computer connected to the internet with a memory, a central processing, and a software, the news report comprising natural language news-based stories relating to financial instruments held in the portfolio, the report comprising a plurality of natural language news stories for each of a plurality of financial instruments in the portfolio.

9. The report of claim 8, wherein the news report is produced in the form of a webpage to be displayed on computer screen.

10. The report of claim 8, wherein the news report is produced in the form of a computer file.

11. The report of claim 8, wherein the news report is generated at the request of a portfolio user based on the portfolio as defined and updated using a management tool by a portfolio manager.

12. The report of claim 8, wherein the report is generated at the request of a portfolio manager using a management tool to select financial instruments in the portfolio.

13. A system for generating natural language news-based stories relating to financial instruments held in a portfolio, the system comprising:
   a computer connected to an Internet, the computer comprising a memory and a central processing unit in functional communication with the memory, and a software executed by the central processing unit in the memory, the software being used to selectively execute either a strategies page or a news report with a plurality of natural language news stories for a plurality of financial instruments held in a portfolio as defined by a portfolio manager; and
   a data retrieval system connected to the Internet in data connection with the computer, with a user interface, a central processing unit connected to the user interface, and a display, wherein the software generates the news report based on a news brief for a plurality of financial instruments in the portfolio, wherein each news story includes a date of publication, a news item rewritten in natural language using a template from a news brief with a news-generating algorithm with sentence and paragraph reconstruction to simulate natural language selected from a plurality of templates each with input variables and at least a data field, and wherein the data retrieval system retrieves either the strategies page or the news report from the personal computer via the Internet for display to the portfolio user.

14. The system of claim 13, wherein the plurality of financial instruments held in the portfolio is defined by the portfolio manager using a management tool.

15. The system of claim 14, wherein the management tool includes a selection of financial instruments taken from a group consisting of analyst favorites, momentum plays, hedged dividend income, stocks in the news, manual selection, related news line items, or stocks with a common push factor.

16. The system of claim 13, wherein the computer and the data retrieval system are both personal computers connected to the Internet referred to as the World Wide Web.

17. The system of claim 13, wherein the news brief is selected from a group consisting of a stock opening value, a daily variability of a financial instrument, a current trading expressed in percentage of rise or fall, a 52-week high value, a 52-week low value, a variability analysis data, a chart analysis data, a news item, a rating, a hedge transaction, a covered call transaction, or profitability data.

18. The system of claim 15, wherein the management tool further includes a function selected from a group consisting of submitting changes to a defined portfolio table, recovering daily default values for the portfolio table, or updating live webpages.

19. The system of claim 13, wherein each of the plurality of natural language news stories includes a header selected from a group consisting of a record number, a number of records, a stock symbol, a headline, or an alternate headline.

20. The system of claim 13, wherein the financial instruments are stocks.

* * * * *